United States Patent
Ha et al.

(10) Patent No.: US 11,120,311 B2
(45) Date of Patent: Sep. 14, 2021

(54) ADJUSTING MACHINE SETTINGS THROUGH MULTI-PASS TRAINING OF OBJECT DETECTION MODELS

(71) Applicant: MIDEA GROUP CO., LTD., Foshan (CN)

(72) Inventors: Thanh Huy Ha, Milpitas, CA (US); Yuxiang Gao, San Jose, CA (US); Zhicai Ou, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 146 days.

(21) Appl. No.: 16/657,975

(22) Filed: Oct. 18, 2019

(65) Prior Publication Data
US 2021/0117717 A1   Apr. 22, 2021

(51) Int. Cl.
| | |
|---|---|
| *G06K 9/62* | (2006.01) |
| *G05B 13/04* | (2006.01) |
| *G06N 20/00* | (2019.01) |
| *G06N 5/04* | (2006.01) |

(52) U.S. Cl.
CPC ........... *G06K 9/628* (2013.01); *G05B 13/048* (2013.01); *G06K 9/6256* (2013.01); *G06N 5/046* (2013.01); *G06N 20/00* (2019.01)

(58) Field of Classification Search
CPC .... G06K 9/628; G06K 9/6256; G05B 13/048; G06N 5/046; G06N 20/00
USPC ........................................................ 382/224
See application file for complete search history.

(56) References Cited

U.S. PATENT DOCUMENTS

| | | | |
|---|---|---|---|
| 8,538,172 B2 * | 9/2013 | Bandou | G06K 9/6257 |
| | | | 382/224 |
| 2006/0074829 A1 | 4/2006 | Aklilu et al. | |
| 2013/0159000 A1 | 6/2013 | Ju et al. | |
| 2017/0371856 A1 * | 12/2017 | Can | G06K 9/3233 |
| 2018/0089497 A1 * | 3/2018 | Romanenko | G06K 9/00221 |
| 2019/0169780 A1 | 6/2019 | Chen et al. | |
| 2020/0116627 A1 * | 4/2020 | Kessler | G01J 3/501 |

FOREIGN PATENT DOCUMENTS

| | | |
|---|---|---|
| CN | 103971342 A | 8/2014 |
| CN | 109811508 A | 5/2019 |

OTHER PUBLICATIONS

MIDEA Group Co., Ltd., International Search Report, PCT/CN2020/119069, dated Dec. 31, 2020, 9 pgs.

* cited by examiner

*Primary Examiner* — Juan A Torres
(74) *Attorney, Agent, or Firm* — Morgan, Lewis & Bockius LLP

(57) ABSTRACT

System and method for controlling a machine, including: receiving a first image processing model trained to classify an input image into a first class for images containing at least one object of a first type or a second class for images not containing an object of the first type; identifying a subset of inference results that are false positive results; generating a set of new training data from the first set of images, including augmenting an image in the first set of images to obtain a respective plurality of images and labeling the respective plurality of images as containing at least one object of a pseudo first class; training a second image processing model to classify an input image into the first class, the second class, and the first pseudo class; and modifying a device setting of a machine based on an inference result of the second image processing model.

20 Claims, 8 Drawing Sheets

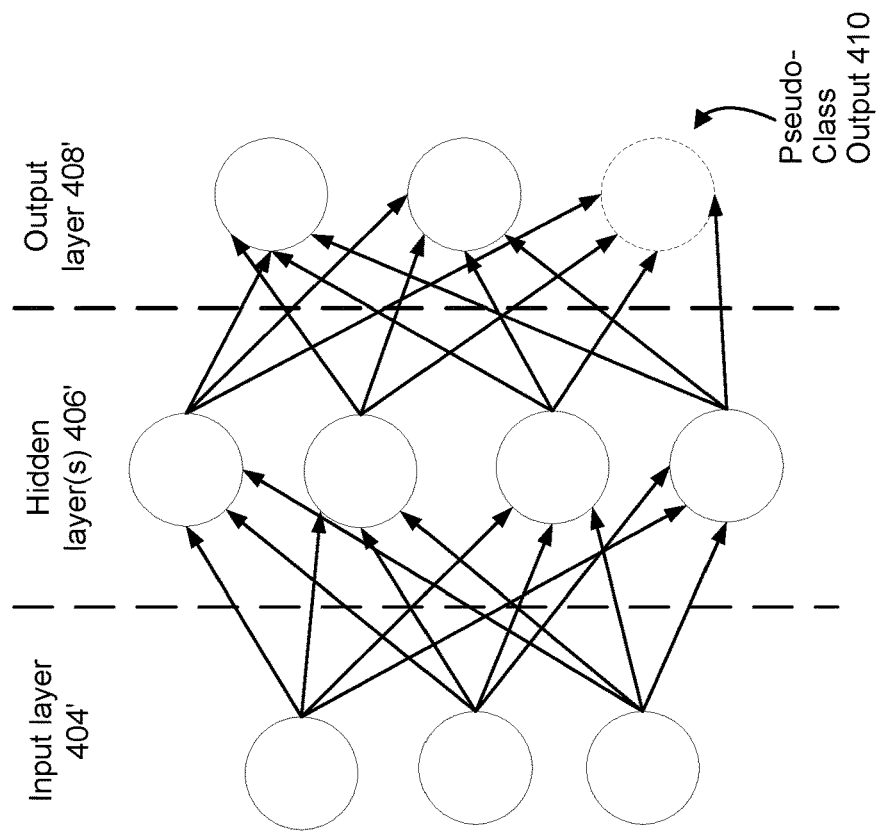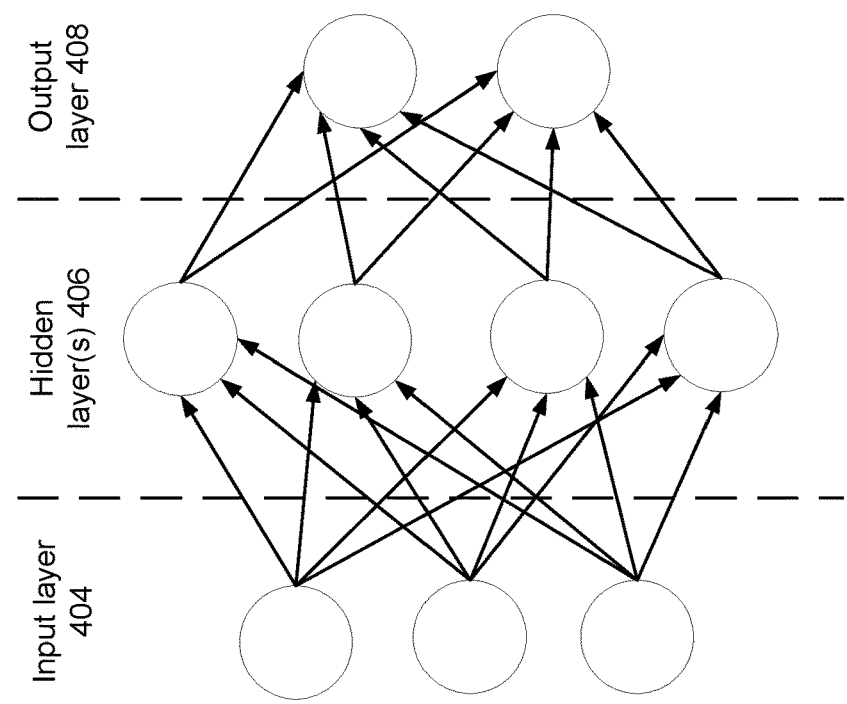
Figure 4

500

```
┌─────────────────────────────────────────────────────────────────────────┐
│ Receive a first image processing model that is trained to classify a    │
│ respective input image into a first class for images containing at      │
│ least one object of a first type or a second class for images not       │
│ containing at least one object of the first type 502                    │
└─────────────────────────────────────────────────────────────────────────┘
                                    │
                                    ▼
┌─────────────────────────────────────────────────────────────────────────┐
│ Identify, from a plurality of inference results output by the first     │
│ image processing model, a first subset of inference results that are    │
│ false positive results classifying a first set of images not containing │
│ at least one object of the first type into the first class for images  │
│ containing at least one object of the first type 504                   │
└─────────────────────────────────────────────────────────────────────────┘
                                    │
                                    ▼
┌─────────────────────────────────────────────────────────────────────────┐
│ Generate a first set of new training data from the first set of images, │
│ including augmenting a respective image in the first set of images to   │
│ obtain a first respective plurality of images and labeling the first    │
│ respective plurality of images as containing at least one object of a   │
│ pseudo first class that is distinct from the first class and the second │
│ class 506                                                               │
└─────────────────────────────────────────────────────────────────────────┘
                                    │
                                    ▼
┌─────────────────────────────────────────────────────────────────────────┐
│ Train, using a training dataset including at least the first set of new │
│ training data, a second image processing model to classify a respective │
│ input image into the first class for images containing at least one     │
│ object of the first type, the second class for images not containing at │
│ least one object of the first type, and the first pseudo class for      │
│ images that contain objects that are prone to misclassification into    │
│ the first class by the first image processing model 508                 │
└─────────────────────────────────────────────────────────────────────────┘
                                    │
                                    ▼
┌─────────────────────────────────────────────────────────────────────────┐
│ Modify a device setting of a first machine based on a first inference   │
│ result of a first input image captured by the first machine, wherein    │
│ the first inference result is generated by the second image processing  │
│ model and corresponds to the first class 510                            │
└─────────────────────────────────────────────────────────────────────────┘
```

Figure 5

Cooking Appliance 600

ADJUSTING MACHINE SETTINGS THROUGH MULTI-PASS TRAINING OF OBJECT DETECTION MODELS

FIELD OF THE TECHNOLOGY

The present disclosure relates to the field of image processing, and in particular, to systems and methods for using improved image processing models to detect objects, and automatically operating a machine based on the detected objects.

BACKGROUND OF THE TECHNOLOGY

Machines such as home appliances often have different predefined operational settings. For example, washing machines have multiple washer cycle settings with different water temperature, tumbling speed, spin speed, and so on. Microwave ovens have multiple cooking settings with different microwave power levels and cooking times. Selecting an appropriate setting is important for optimizing the performance of a machine. For example, selecting an appropriate washer cycle setting for a load of laundry is important in preventing damages to clothes (e.g., stretching, shrinking, or discoloration) and achieving optimal cleaning result. In some situations, a machine relies on image processing models to detect one or more objects (or object types) to be operated on (e.g., the type of clothes for washing machines, and the type of food items for microwave ovens), and automatically selects a machine operational setting based on the detected one or more objects (or object types).

Machine learning models such as convolutional neural networks (CNNs) and their variations are powerful image processing models, and are widely used for object detection tasks. However, performance of the machine learning models are often poor, resulting in inaccurate classification and detection of relevant objects that are subject of operations for various machines.

For these reasons, improved image processing models for object detection and classification are highly desired.

SUMMARY

As stated in the background, machine learning models such as convolutional neural networks (CNNs) and their variations are powerful image processing models, and are widely used for object detection tasks. However, detecting objects with both high precision (e.g., low false positive rates) and high recall (low false negative rates) are challenging, sometimes due to the presence of classes of objects that are prone to misclassification such as "hard" negative samples that look very similar to positive samples under the view of the object detection/classification algorithms (false positives), or "hard" positive samples that look very similar to negative samples (false negatives). For example, when loaded into a washing machine's drum, clothes tend to be tangled, twisted, and even knotted. As a result, existing image processing models often consistently produce false positive outputs by falsely recognizing a class of clothes (e.g., shirt that are twisted and tangled) as another class of clothes (e.g., brassieres). If a washing machine mistakenly selects a washer cycle setting designed for washing shirts (e.g., high tumbling speed, high spin speed, and so on) for brassieres (e.g., requires slow tumbling speed and low spin speed), the washing machine can permanently damage the brassieres.

For these reasons, improved methods and systems for increasing the precision of object detection and bi-class classification of image processing models while maintaining the high recall, and for automatically selecting a machine operational setting based on the detected and classified objects, are highly desired.

The present disclosure describes a system and method for receiving a first image processing model that is trained to classify a respective input image into a first class for images containing at least one object of a first type or a second class for images not containing at least one object of the first type; identifying, from a plurality of inference results output by the first image processing model, a first subset of inference results that are false positive results classifying a first set of images not containing at least one object of the first type into the first class for images containing at least one object of the first type; generating a first set of new training data from the first set of images, including augmenting a respective image in the first set of images to obtain a first respective plurality of images and labeling the first respective plurality of images as containing at least one object of a pseudo first class that is distinct from the first class and the second class; training, using a training dataset including at least the first set of new training data, a second image processing model to classify a respective input image into the first class for images containing at least one object of the first type, the second class for images not containing at least one object of the first type, and the first pseudo class for images that contain objects that are prone to misclassification into the first class by the first image processing model; and modifying a device setting of a first machine based on a first inference result of a first input image captured by the first machine, wherein the first inference result is generated by the second image processing model and corresponds to the first class.

Based on the methods and systems described herein, various issues associated with using image processing models to detect and classify objects that are prone to misclassification are addressed.

In one aspect, in accordance with some embodiments, a method is performed by a computing system that is communicably coupled with a home appliance and that is configured to control one or more functions of the home appliance.

In accordance with some embodiments, a computing system includes processors and memory storing instructions that, when executed, causes the one or more processors to perform the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause the performance of the operations of any of the methods described herein. In accordance with some embodiments, an electronic device includes: means for capturing images, and means for performing or causing the performance of the operations of any of the methods described herein.

Various additional advantages of the present application are apparent in light of the description below.

BRIEF DESCRIPTION OF THE DRAWINGS

The aforementioned features and advantages of the disclosed technology, as well as additional features and advantages thereof, will be more clearly understood hereinafter as a result of a detailed description of preferred embodiments when taken in conjunction with the drawings.

To describe the technical solutions in the embodiments of the presently disclosed technology or in the prior art more clearly, the following briefly introduces the accompanying drawings required for describing the embodiments or the prior art. Apparently, the accompanying drawings in the following description show merely some embodiments of the presently disclosed technology, and persons of ordinary skill in the art may still derive other drawings from these accompanying drawings without creative efforts.

FIG. 4 is a schematic of image processing models that are generated during the multi-pass training process described in FIG. 3, with the updated model having increased precision of object detection and bi-class classification while maintaining the recall, in accordance with some embodiments.

FIG. 5 is a flowchart diagram of a method for performing an automated machine setting selection based on image detection and bi-class classification results produced through multi-pass training of object detection models, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

Figure 1A:
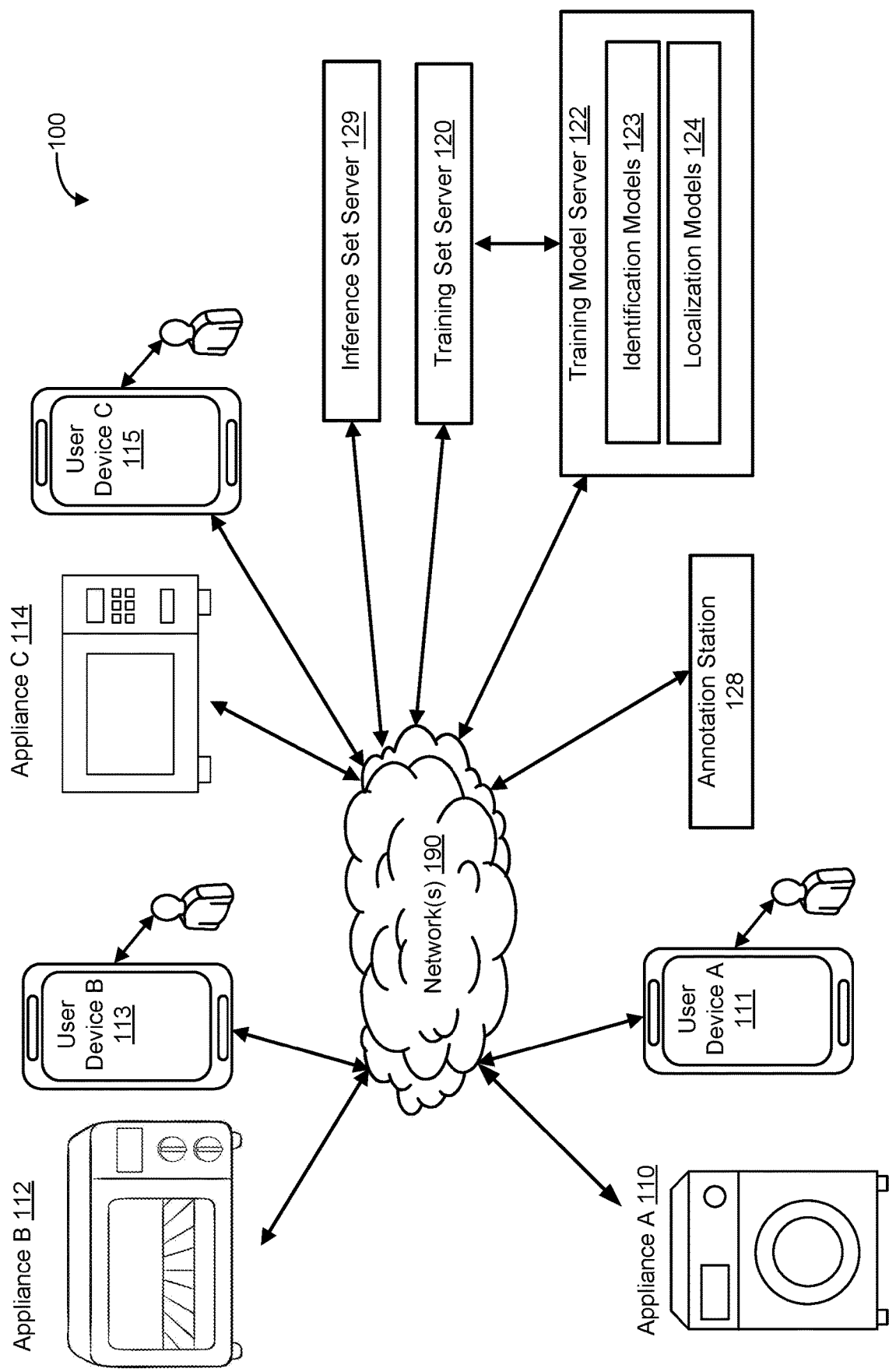
FIG. 1A shows a block diagram of an operation environment of a home appliance system, in accordance with some embodiments.

FIG. 1A shows a block diagram of an operation environment 100 of a home appliance system in accordance with some embodiments.

The operation environment 100 of a home appliance system includes one or more home appliances (e.g., appliance A 110, appliance B 112, and appliance C 114), connected to one or more servers (e.g., training set server 120 and training model server 122), and optionally to one or more user devices (e.g., user device A 111, user device B 113, and user device C 115) and/or annotation station(s) 128, via network 190 (e.g., a wide area network such as the Internet, or a local area network such as a smart home network).

In some embodiments the one or more home appliances (e.g., smart washing machines, smart microwave ovens, etc.) are configured to collect raw sensor data (e.g., image, weight, temperature, thermal map data, etc.) and send the raw sensor data to corresponding user devices (e.g., smart phones, tablet devices, etc.), annotation station 128 (e.g., workstations and desktop computers), and/or training set server 120 (e.g., server provided by the manufacturer of the home appliances or third-party service providers for the manufacturer). In some embodiments, the one or more home appliances are also configured to receive control instructions from training model server 122 and/or a corresponding user device (e.g., appliance C 114 may receive control instructions from training model server 122 to set the microwave oven temperature to 425° F. for roasting vegetables and appliance A 110 may receive control instructions from user device A 111 to select a washer cycle). Additional details regarding the one or more home appliances (e.g., appliance A 110, appliance B 112, and appliance C 114) is described in detail with reference to other parts of the present disclosure.

In some embodiments, the one or more user devices are configured to receive raw sensor data from a respective appliance (e.g., user device A 111, which corresponds to appliance A 110, is configured to receive raw sensor data from appliance A 110). In some embodiments, the one or more user devices are also configured to send annotated data to annotation station 128 and/or training set server 120. In some embodiments, the one or more user devices are configured to generate and send control instructions to the respective appliance (e.g., user device A 111 may send instructions to appliance A 110 to turn appliance A 110 on/off or to select a setting on appliance A 110). In some embodiments, the one or more user devices include, but is not limited to, a mobile phone, a tablet, or a computer device. In some embodiments, one or more user devices may correspond to one appliance (e.g., a computer and a mobile phone may both correspond to appliance A 110 (e.g., both are registered to be a control device for appliance A in an appliance setup process) such that appliance A 110 may send raw sensor data to either or both the computer and the mobile phone). In some embodiments, a user device corresponds to (e.g., shares data with and/or is in communication with) an appliance (e.g., user device A 111 corresponds to appliance A 110). For example, appliance A 110 may collect data (e.g., raw sensor data, such as images or temperature data) and send the collected data to user device A 111 so that the collected data may be annotated by a user on user device A 111.

In some embodiments, annotation station 128 is configured to receive collected data from the one or more appliances (e.g. appliances 110, 112, and 114) so that the collected data may be annotated by specialized annotation personnel. In some embodiments, annotation station 128 is configured to receive annotated data from the one or more user devices (e.g., user devices 111, 113, and 115) for review, editing, and/or approval by the specialized annotation personnel. In some embodiments, when annotated data from the one or more user devices have been approved at annotation station 128, annotation station sends the approved data to training set server 120 to be included in the training dataset stored at the training set server. In some embodiments, annotation station 128 retrieves annotated data from server 120 for review, editing, and/or approval by the specialized annotation personnel. In some embodiments, annotation station 128 retrieves unannotated data from server 120 for annotation by the specialized annotation personnel. Sensor data that has been annotated and/or approved at annotation station 128 is returned to server 120 for inclusion in the training dataset.

In some embodiments, training set server 120 is configured to receive raw sensor data from the one or more home appliances (e.g. appliances 110, 112, and 114), and/or receive annotated data from the one or more user devices (e.g., user devices 111, 113, and 115). In some embodiments, training set server 120 is also configured to send raw and/or annotated data to annotation station 128, and receive annotated and/or approved annotated data from annotation station 128. Training set server 120 is configured to preprocess the annotated data, e.g., to group, divide, and correlate the training data, and index and store the training data, in accordance with the training models and training methods employed by training model server 122. Training set server 120 is configured to send selected training data (e.g., data that includes, corresponds to, or is based on annotated data that has been approved at annotation station 128) to training model server 122, in accordance with the particular training model requesting the training data.

In some embodiments, training model server 122 is configured to receive training data from training set server 120. Training model server is also optionally configured to send control instructions (e.g., machine instructions prepared according to the control protocols of a particular home appliance) and/or send text data (e.g., text messages) to the one or more appliances and/or user devices. Training model server 122 includes identification models 123 (e.g., for identifying and classifying objects), localization models 124 (e.g., for localizing and outlining objects), and other models. Identification models 123 are related to identifying objects being operated on by a home appliance (e.g., clothes, food items, etc.). Localization models 124 are related to locating items in a home appliance. For example, localization models 124 may be used to identify two pieces of chicken on a left side of the oven rack of the smart oven and four cookies on the right side of the oven rack of the smart oven, and outline each of them in an image captured by the smart oven. Training model server 122 trains identification model 123, localization models 124 and/or other models based on training data received from training set server 120. Once the training of identification models 123, localization models 124 and other models are sufficiently completed (e.g., achieved a threshold level of accuracies), the training set server 120 receives requests from home appliances to determine item identity/location in real-time based on sensor data captured by the home appliances. In some embodiments, the condition of the items determined by the training set server 120 is provided back to the requesting home appliances, such that each home appliance determines an appropriate action, e.g., changing an operation of the home appliance and/or alerting a user, based on the determined condition of the item.

In some embodiments, home appliances (e.g. appliances 110, 112, and 114), user devices (e.g., user devices 111, 113, and 115), annotation station 128, training set server 120, and training model server 122 are connected (e.g., sharing data with and/or in communication with) through one or more networks 190. One or more networks 190 may include wired and wireless networks and may be a local area network of a home or a wide area network (e.g., Internet).

Figure 1B:
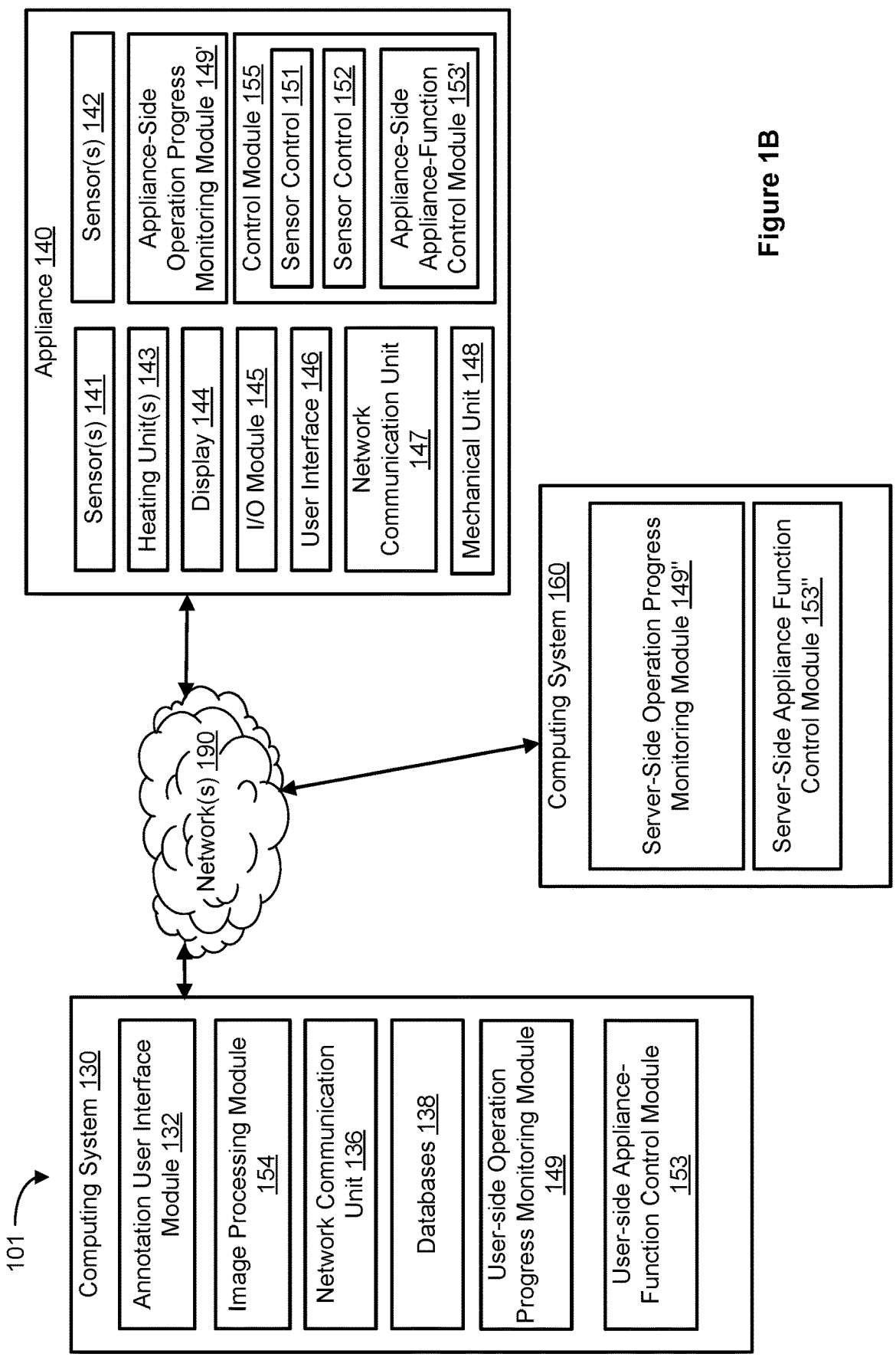
FIGS. 1B-1C show block diagrams of a home appliance system, in accordance with some embodiments.

FIG. 1B show block diagrams of a home appliance system 101 in accordance with some embodiments.

In some embodiments, as shown in FIG. 1B, home appliance system 101 includes home appliance 140 and computing system 130 that is implemented separately from home appliance 140. Home appliance 140 can serve as any of home appliances 110, 112, and 114 in FIG. 1A. In some embodiments, computing system 130 is in communication with home appliance 140 through one or more networks 190. In some embodiments, computing system 130 is implemented on a user device (e.g., in association with a user application for controlling and interacting with the home appliance). In some embodiments, computing system 130 and appliance 140 further communicate with computing system 160 to accomplish some of the functions on computing system 130 and appliance 140 in accordance with a client-server configuration. In some embodiments, computing system 160 is implemented on a server of a manufacturer of the home appliance (e.g., on training model server 122). In some embodiments, computing system 160 is implemented on a standalone computer (e.g., on a local server of a smart home).

Referring to FIG. 1B, computing system 130 includes one or more of annotation user interface module 132, imaging processing module 155, network communication unit 136, and one or more databases 138. which corresponds to user devices as described above with respect to FIG. 1A (e.g., user devices 111, 113, and 115). In some embodiments, computing system 130 further includes user-side operation progress monitoring module 149 and user-side appliance-function control module 153 to facilitate the machine operation progress monitoring and appliance control aspects of the home appliance system, in addition to the data collection and annotation aspect of the home appliance system as described herein.

In some embodiments, annotation user interface module 132 allows a user of computing system 130 to view and annotate raw sensor data received from a corresponding appliance 140 (e.g., appliance 110, 112, or 114). For example, a user may use an application on their user device (e.g., user device 111, 113, or 115) to view images and temperature data recorded by a corresponding appliance. The user may be able to add annotations and details to the collected data, in accordance with some embodiments.

In some embodiments, image processing module 154 obtains images captured by imaging system of appliance 140 and processes the images for analysis. The functions of image processing module 154 and imaging system of appliance 140 are described below with respect to 3, for example.

Network communication unit 136 allows computing system 130 to communicate with appliance 140 and/or computing system 160 over one or more networks 190.

In some embodiments, databases 138 include a database of previously captured images of objects or images from other similar home appliance systems. In some embodiments, databases 138 includes ingredient databases that allow the computing system to provide nutritional information and recipes to the user, or clothes databases that allow the computing system to provide washing instructions to the user.

In some embodiments, computing system 130 includes an application that provides user-side functions, such as user-side operation progress monitoring and appliance-function control, in conjunction with computing system 160 and appliance 140.

In some embodiments, user-side progress monitoring module 149 is configured to determine progress of machine operation based on real-time sensor data captured by appliance 140.

In some embodiments, user-side appliance-function control module 153 is configured to provide a user interface for the user to directly control the appliance functions (e.g., turning the appliance on/off or setting an appliance parameter, etc.), and/or automatically generate control instructions based on the result of the progress monitoring. In some embodiments, the result of the progress monitoring is provided to the user-side appliance-function control module 153 from the user-side progress monitoring module 149. In some embodiments, the result of the progress monitoring is provided to the user-side appliance-function control module 153 from computing system 160. In some embodiments, the result of the progress monitoring is provided to the user-side appliance-function control module 153 from appliance 140.

In some embodiments, appliance 140 includes one or more first sensors (e.g., sensors 141), one or more heating units 143, display 144, I/O module 145, user interface 145, network communication unit 147, mechanical unit 148, control module 155, imaging system, and, optionally, appliance-side operation progress monitoring module 149'. Control module 155 includes an optional appliance-side appliance-function control unit 153'.

In some embodiments, the one or more first sensors 141 are configured to capture structured data, such as temperature, weight, and/or humidity. Structured data, as discussed herein, refers to quantitative or state data such as temperature, humidity, time, on/off, oven mode, etc. For example, the one or more first sensors 141 may be a temperature sensor (e.g., thermometer) or a humidity sensor, or weight sensor of the home appliance 140.

In some embodiments, the one or more heating units 143 are configured to heat at least a portion of the of the appliance (e.g., a heating coil configured to heat a cooking chamber of a smart oven).

In some embodiments, appliance 140 includes a display 144 that can provide information about appliance 140 to a user (e.g., the currently selected washer cycle). In some embodiments, display 144 may be integrated with I/O module 145 and user interface 146 to allow the user to input information into or read out information from appliance 140. In some embodiments, display 144 in conjunction with I/O module 145 and user interface 146 provides recommendations, alerts and nutritional information to the user and receive control instructions from the user (e.g., via hardware and/or software interfaces provided by appliance 140). In some embodiments, display 144 may be a touch screen display or a display that includes buttons. In some embodiments, display 144 may be a simple display with no touch-screen features (such as a conventional LED or LCD display) and user interface 146 may be hardware buttons or knobs that can be manually controlled. In some embodiments, user interface 146 optionally includes one or more of the following a display, a speaker, a keyboard, a touch-screen, a voice input-output interface etc.

Network communication unit 147 is analogous in function to network communication unit 147. Network communication unit 147 allows appliance 140 to communicate with computing system 130 and/or computing system 160 over one or more networks 190.

Mechanical unit 148 described herein refers to hardware and corresponding software and firmware components of appliance 140 that are configured to physically change the internal sensing (e.g., imaging), heating and/or layout configuration of the home appliance 140. For example, the one or more first sensors 141 may correspond to a mechanical unit such that the one or more sensors 141 are movable to scan a respective area inside appliance 140 (e.g., a motor may be configured to move a sensor across a predetermined area in order to capture data across the predetermined area). In some embodiments, the mechanical units 148 of the appliance 140 are operated in accordance with instructions from the appliance-function control unit of the home appliance system (e.g., appliance-side appliance-function control module 153', user-side appliance-function control module 153, and/or server-side appliance-function control module 153").

In some embodiments, appliance-side operation progress monitoring module 149' is configured to monitor operation progress of appliance 140. For example, if the appliance is a smart oven, appliance-side operation progress monitoring module 149' may, based on raw data recorded by the one or more first sensors 141 and/or the one or more second sensors 142, determine that the food has been cooked to medium doneness. In some embodiments, appliance-side operation progress monitoring module 149' is configured to determine cooking progress of food items based on real-time sensor data captured by sensors 141 and imaging system using food item location and outline determination models and food cooking progress level determination models that have been trained on computing system 160.

In some embodiments, imaging system includes one or more second sensors 142. The one or more second sensors 142 are configured to capture unstructured data. Examples of unstructured data include RGB images and thermal or infrared images. For example, if the appliance is a smart oven, the one or more second sensors 142 may be configured to capture or record still images or videos of the food present in a cooking compartment of an appliance. In some embodiments, if the appliance is a smart oven, imaging system includes a data storage system that stores the dimensions of the food cooking compartment, and the dimensions of the reference markers within the food cooking compartment, the distances between the camera and the various reference markers within the food cooking compartment, such that images taken by the cameras can be used to accurately determine the size and shape of the food items within the images. Thus, the imaging system eliminates the problems with conventional imaging systems which require the user's special attention to place a reference marker within the images or use images without the benefit of the size and location and orientation information of the items within the images. In some embodiments, the imaging system includes an image capture triggering system. For example, in some embodiments, the image capturing is triggered when the image capture triggering system detects that there has been a change in the field of view of the camera. For example, when the oven door is opened, the lighting condition in the oven will be changed, and the image capturing will be triggered in response to the opening of the oven door. In some embodiments, the image capturing is triggered when the food item starts to appear in the field of view of the camera. In some embodiments, the image capturing is triggered when then food item is completely inserted and the oven door is closed. In some embodiments, the image capture trigger system also instructs the camera to capture and store an image of the oven rack immediately before the oven door is opened, as the compartment baseline image of the interior of the oven. In some embodiments, the image capturing is triggered manually in response to a user's input, for example, after the user has inserted the food item into the food cooking compartment. Manual trigger is easier and less complicated to implement, and allows the user to purposefully capture images that best reflect the characteristics of the food item for ingredient recognition. In some embodiments, image processing module 154 obtains the images captured by the one or more second sensors 142, and preprocesses the images to remove the background from the images based on the compartment baseline image captured before the insertion of the food item. The compartment baseline image captures the exact condition of the food support platform in the food cooking compartment of the home appliance system, and provides an excellent filter for the images containing the food item to remove the background.

In some embodiments, control module 155 includes sensor control 151, sensor control 152, and appliance-side appliance-function control module 153'. Sensor control 151 is configured to control and adjust the one or more first sensors 141. For example, sensor control 151 may send instructions for the one or more first sensors 141 to record temperature data at 1-minute intervals. Sensor control 152 is configured to control and adjust the one or more second sensors 142. For example, sensor control 152 may send instructions for the one or more second sensors 142 to be moved along a first direction and to take capture a picture when the one or more second sensors 142 are at the starting position before being moved and at the final position after being moved.

Appliance-side appliance-function control module 153' is configured to control and adjust the various functions of appliance 140. For example, appliance-side appliance-function control module 153' may send instructions to heating units 143 to activate a first heating unit of the one or more heating units, or may send instructions to mechanical unit 148 to change its position. In some embodiments, appliance-side appliance-function control module 153' generates and send control instructions to various components of the appliance 140 based on preconfigured operation protocols (e.g., to implement the normal routine functions of the appliance 140). In some embodiments, appliance-side appliance-function control module 153' generates and send control instructions to various components of the appliance 140 based on real-time operation progress monitoring within the home appliance (e.g., to adjust functions of the appliance 140 automatically without user intervention based on preset reactions protocols or programs). In some embodiments, appliance-side appliance-function control module 153' generates and send control instructions to various components of the appliance 140 based on real-time user instructions received from user devices or via user interface 146 of appliance 140. In some embodiments, the result of the operation progress monitoring is provided to the appliance-side appliance-function control module 153' from the user-side operation progress monitoring module 149. In some embodiments, the result of the operation progress monitoring is provided to the appliance-side appliance-function control module 153' from computing system 160. In some embodiments, the result of the operation progress monitoring is provided to the appliance-side appliance-function control module 153' from appliance-side operation progress monitoring module 149'.

In some embodiments, computing system 160 includes server-side operation progress monitoring module 149" and server-side appliance-function control module 153". In some embodiments, the server-side operation progress monitoring module 149" employs identification models 123, localization models 124 and other models shown in FIG. 1A to determine object identity, location, outlines, and other conditions from real-time sensor data received from home appliance 140 (e.g., directly or through computing system 130). In some embodiments, computing system 160 is implemented by training model server 122 in FIG. 1A, for example.

The functions of various systems within home appliance system 101 in FIG. 1B are merely illustrative. Other configurations and divisions of the functionalities are possible. Some functions of one sub-system can be implemented on another sub-system in various embodiments.

Figure 1C:
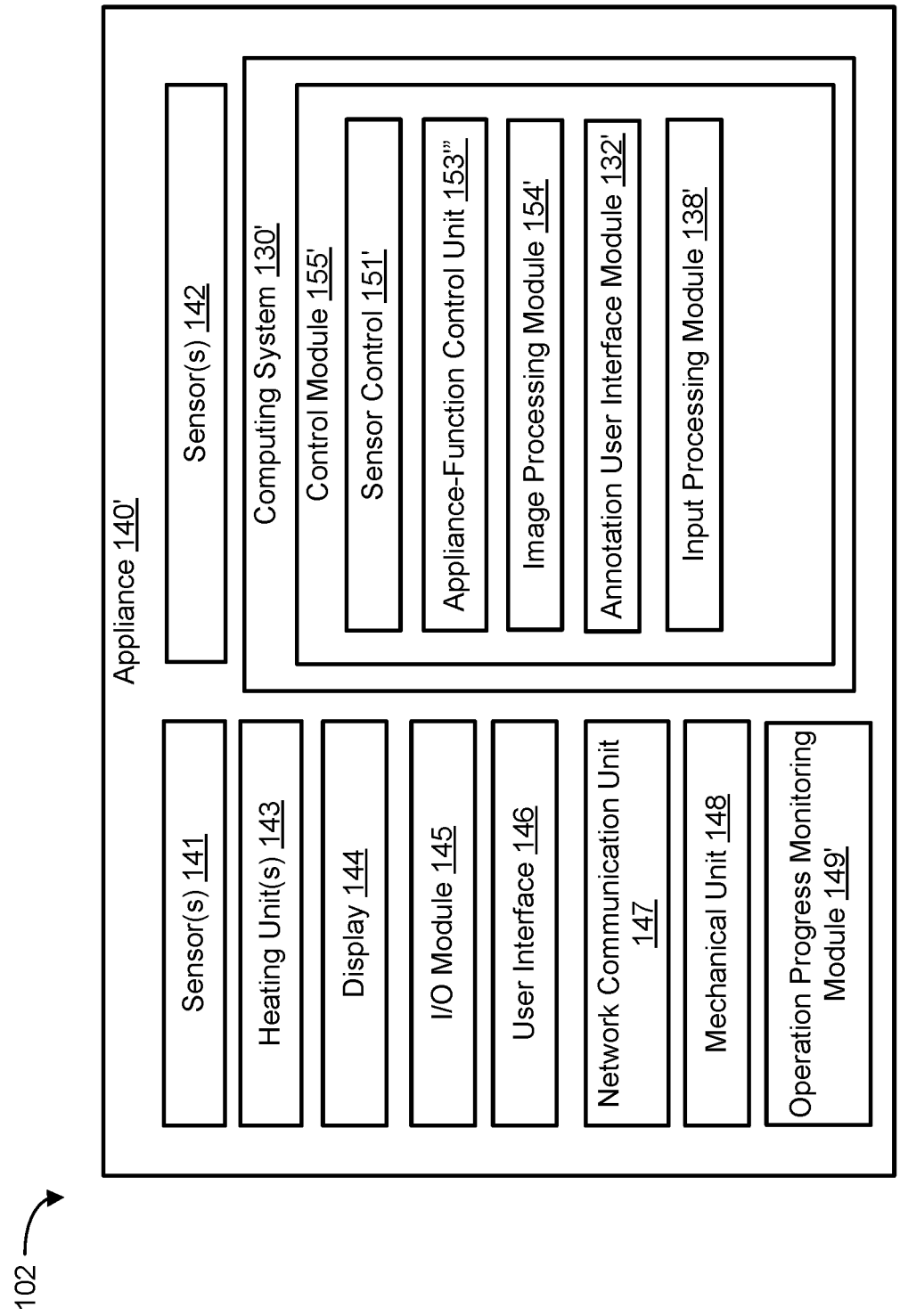

In some embodiments, as shown in FIG. 1C, home appliance system 101 includes a computing system 130' that is integrated with appliance 140'. In some embodiments, computing system 130' communicates with computing system 160 to accomplish some of the functions of appliance 140'. In some embodiments, appliance 140' optionally communicates with computing system 160 to outsource some of the functions of appliance 140'.

Referring to FIG. 1C, appliance 140' has a built-in computing system 130'. Appliance 140' includes sensors 141, heating unit(s) 143, display 144, I/O module 145, user interface 146, network communication unit 147, mechanical unit 148, and imaging system. These components of appliance 140' correspond to those in appliance 140 and have similar functionalities that will not be repeated herein for brevity.

In some embodiments, computing system 130' within appliance 140' includes control unit 155', sensor control 151', sensor control 152', appliance-side operation progress monitoring system 149', appliance-side appliance-function control module 153', image processing system 154', databases 138', and appliance-side annotation user interface module 132'. The functions of these components correspond to their respective counterparts with the same names in appliance 140 (e.g., sensor control 151' has the same function as sensor control 151) and will not be repeated for brevity. In some embodiments, annotation user interface module 132 may allow a user to view and annotate raw user data on a user device, separate from appliance 140. In comparison, appliance-side annotation user interface module 132' may allow a user to view and annotate raw user data on display 144 of appliance 140' and/or annotate the operation progress levels in the images with voice input.

The above examples are provided merely for illustrative purposes. More details of the functions of the various components are set forth below with respect to other figures and illustrations. It can be understood that one or more components described herein may be used independently of other components.

Figure 2:
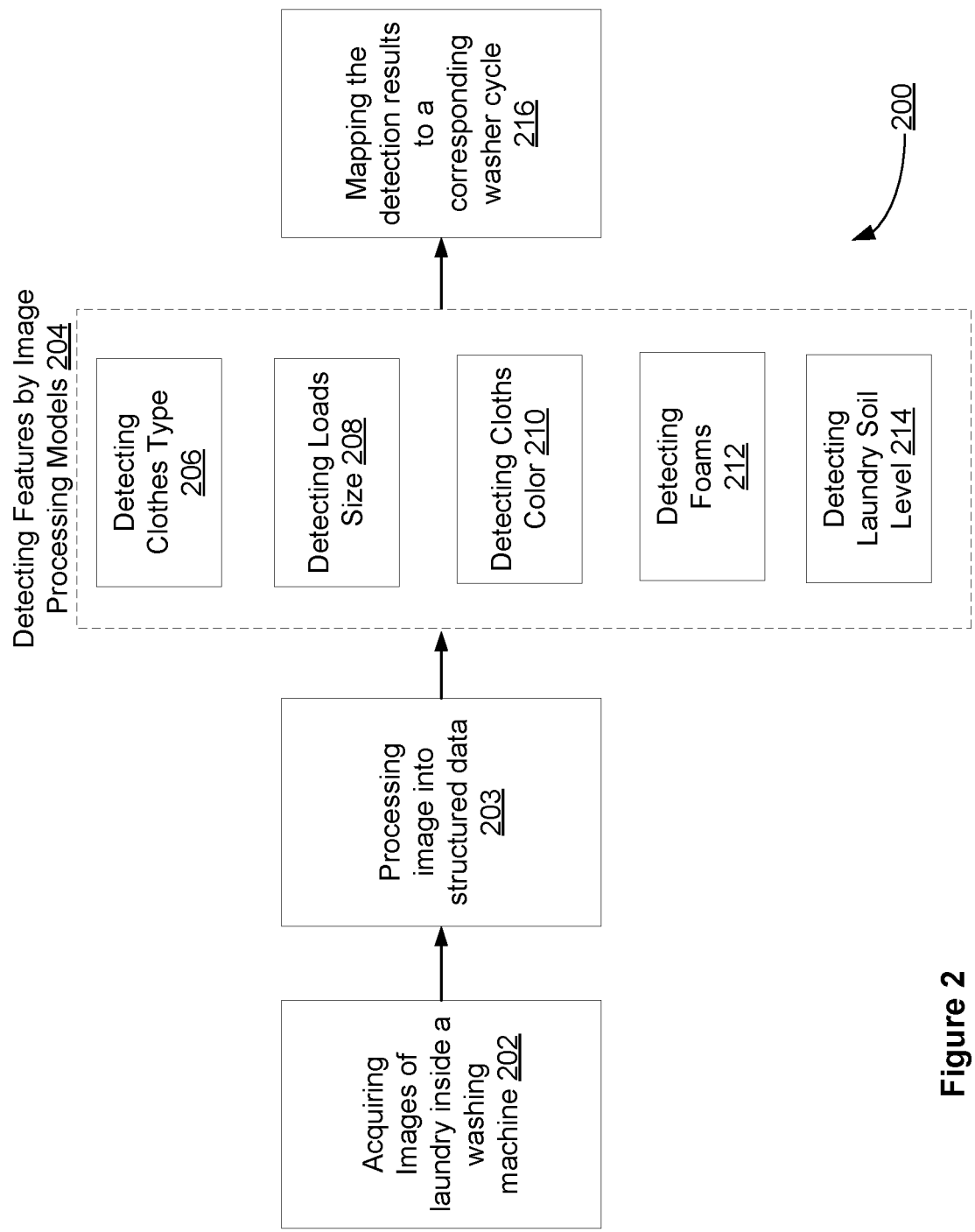
FIG. 2 is a schematic of a process for automatically selecting a washer cycle setting based on detected images of laundry loaded in a washing machine, in accordance with some embodiments.

FIG. 2 is a schematic of a process 200 for automatically selecting a washer cycle setting based on detected images of loaded laundry inside a washing machine, in accordance with some embodiments. For convenience, the process 200 is described as being performed by a computing system of a washing machine (e.g., the computing system 130' of the appliance 140' in FIG. 1C.

Instead of relying on a user's manual selection of a washer cycle setting, the computing system of the washing machine uses image detection and classification models to recognize clothes types, and automatically selects a suitable washer cycle setting. In some embodiments, the automatically selected washer cycle setting is based on detected characteristics of the loaded clothes (e.g., fabric texture, color, size, type, etc.), and is set to minimize damages (e.g., color fading, tearing, stretching, etc.) to clothes during washing. In some embodiments, the automatically selected washer cycle is set to prevent damages to the washing machine. For example, if the computing system detects clothes with metal parts such as metal zippers, the computing system may select a washer cycle with reduced tumbling to prevent the metal parts from scratching the drum of the washing machine. In some embodiments, the computing system allows a user to prioritize washing objectives (e.g., to prevent damage to clothes, to maximize cleaning results, to minimize washing time, etc.), and the computing system will automatically select a washer cycle according to the user's configuration. In some embodiments, the user can disable the automatic washer cycle setting selection and instead selects a washer cycle setting manually.

To automatically select a washer cycle, the computing system of the washing machine first acquires a plurality of images of laundry loaded inside the washing machine (202). In some embodiments, one or more cameras (e.g., the sensors(s) 141 or 142 of FIG. 1B) are installed in the washing machine with a field of view covering the drum of the washing machine. For example, the one or more cameras can be installed on a washing machine door or window. In some embodiments, to acquire more representative and complete pictures of the loaded laundry, the washing machine drum tumbles slightly (e.g., half a turn) between each image capturing session to spread out the loaded laundry. In some embodiments, the one or more cameras take a video of the load laundry while the washing machine drum tumbles. In some embodiments, prior to formally initiating the washing cycles based on a respective setting for the washing cycle, the computing system instructs the washing machine to start the rotation of the machine drum and takes a sequence of images of the clothing items within the machine drum, and use each of those images as input images for object detection and classification. The final inference results from multiple of these input images are obtained by combining the inference results from each of the input images. For example, in some embodiments, as long as the inference result from a single input image among the multiple images indicates a presence of a particular type of clothing items with the most restrictive setting requirements among the clothing items identified, the machine setting is modified based on the presence of that particular type of clothing items. In some embodiments, detecting of the particular type of clothing item in a threshold number of input images among the multiple input images are required to trigger the modification of the machine setting.

Once the one or more cameras finish taking images of the loaded laundry, the computing system sends the images to an image processing module (e.g., the image processing module 154' in FIG. 1C) for preprocessing (203). During preprocessing, unstructured image raw data is transformed before it is fed to the image processing models. The preprocessing can help improving training speed and classification accuracy. Exemplary preprocessing techniques include aspect ratio standardizing, image scaling, mean normalization, data normalization, dimension reduction, data augmentation, and so on.

Next, the preprocessed images are sent to one or more image processing models for feature detections (204). In some embodiments, the image processing models are stored and executed locally in the computing system of the washing machine. Alternatively, the image processing models are stored and executed in a remote server (e.g., the inference set server 129 of FIG. 1A) connected to the computing system of the washing machine via a network (e.g., the network(s) 190 in FIG. 1A). The image processing models can be updated continuously via the network throughout the work life of the washing machine.

In some embodiments, the image processing models receive the preprocessed laundry images as inputs, and output one or more detected features of the loaded laundry. The image processing models can include one or more image detection algorithms such as Convolutional Neural Network (CNN), Regional-based CNN (R-CNN), Fast and Faster R-CNN, Region-based Fully Convolutional Network (R-FCN), You-Only-Look-Once (YOLO), Single Shot Detector (SSD), and so on. Due to the high resource cost associated with training image processing models, in some embodiments, the image processing models are first trained in a remote computing system (e.g., the training model server 122 of FIG. 1A), and sent to the local computing system of the washing machine via a network update.

In some embodiments, each image processing model is configured to detect one type of feature. For example, a separate image processing model can be configured to detect clothes type (206), load size (208), clothes colors (210), foams (212), soil level (214), and so on. In some embodiments, the image processing models receive additional inputs from sensors installed in the washing machine for feature detection. For example, one or more weight scales can be installed in the washing machine to measure the load weight. In some embodiments, each image processing model is a bi-classification classifier. For example, an image processing model can be configured to determine whether an image contains "shirt" or not, or the image processing model can be configured to determine whether the image contains "red colored clothes" or not.

A problem associated with using image processing models to detect clothes types is that certain clothes types are prone to misclassification and consistently cause the image processing models to generate false positive results (or alternatively, false negative results). This may be due to the fact that cloths are often twisted and tangled in the drum, thus hiding their full features. For example, shirts that are tangled and twisted may look very similar to brassieres, and cause an image processing model to falsely determine that shirts are brassieres (false positives). To increase the precision of object detection and classification (e.g., reduce the number of false positive results) while maintaining the recall (e.g., do not increase the number of false negative results) by an image processing model, a modified machine learning training process is implemented on the training servers (e.g., the training model server 122 of FIG. 1A). The modified machine learning training process is described in detail with reference to FIG. 3.

After the image processing models detect and classify the loaded laundry, the computing system of the washing machine maps the detection results to corresponding washer cycles (216). Exemplary washer cycles include regular cycle (e.g., for cotton clothes), permanent press cycle (e.g., for colored clothes), delicate cycle (e.g., for fine-material clothes), and so on. Each cycle is associated with different water temperature, tumbling speed, spinning speed, and washing time.

The mapping from the detection results to corresponding washer cycles setting is preconfigured and can be later updated via a remote server (e.g., the computing system 130 of FIG. 1B). For example, the mapping may be configured to maximize one or more washing goals such as preserving the clothes life, reducing washing time, removing stain, and so on. The mapping can be based on the materials, texture, size, number, and color of the detected clothes. For example, if the computing system detects that the laundry load contains bright-colored clothes made of wool, a gentle washer cycle may be used.

FIG. 2 is an example of how a machine setting may be controlled in accordance with object detection and classification results from an image processing module that is generated through a multi-pass training process, as described herein. Other types of machines, such a clothes dryer with different drying settings for different types of clothing items identified in an image of the dryer drum, an oven with different cooking settings for different types of food items identified in an image of the oven chamber, a dish washer with different washing settings for different types of dishes and containers that are in the dish rack, etc., are optionally controlled using the method described herein for various operations of the machines with variable settings, in accordance with some embodiments.

Figure 3:
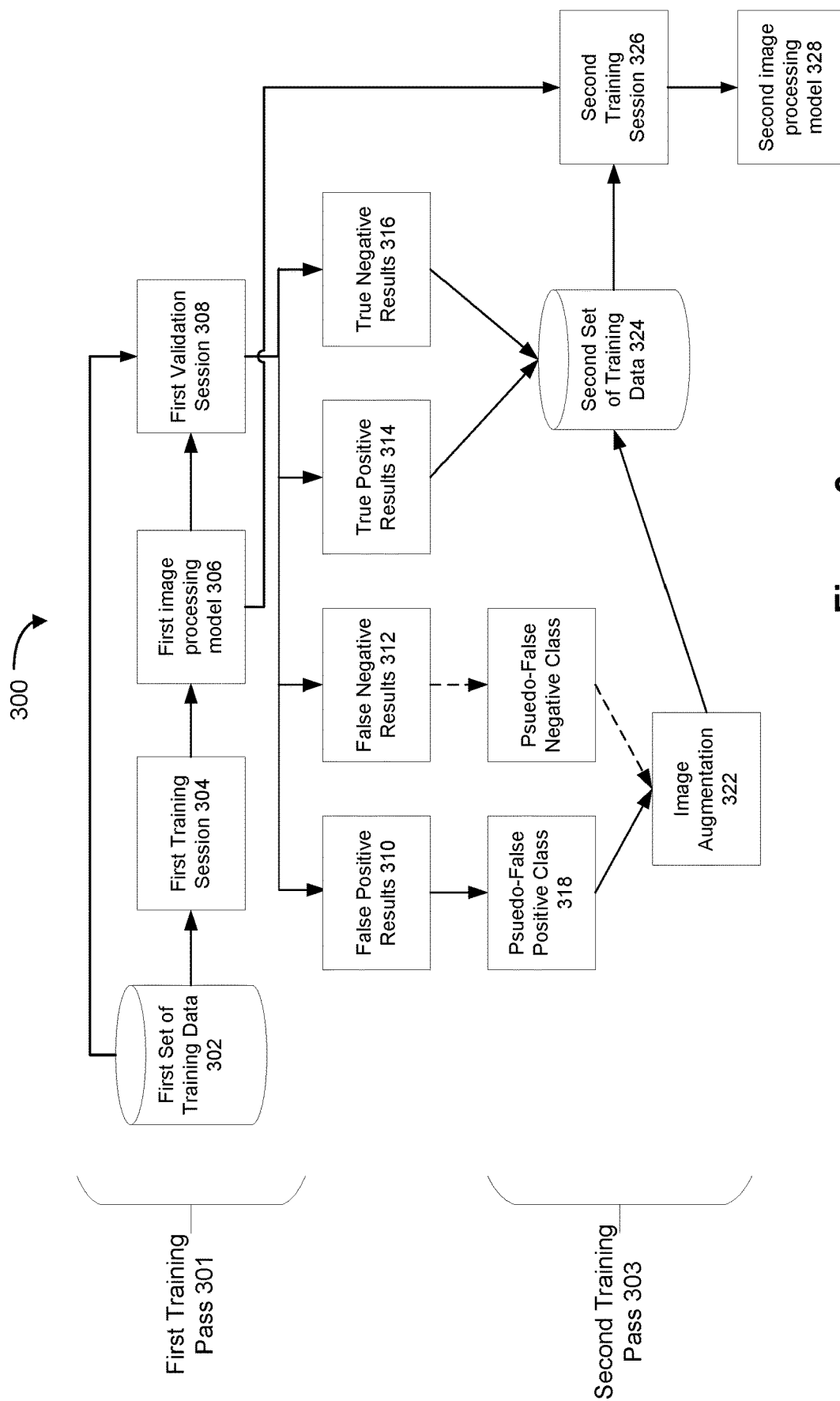
FIG. 3 is a schematic of a process for training an image processing model to increase the precision of object detection and bi-class classification while maintaining the recall, in accordance with some embodiments.

FIG. 3 is a schematic of a process 300 for training an image processing model in a multi-pass training process, in accordance with some embodiments. For convenience, the process 300 is described as being performed by a remote server (e.g., the training model server 122 of FIG. 1A). The process 300 outputs a trained image processing model to be stored and used by a local computing system (e.g., the computing system 130' of FIG. 1C). In an alternative embodiment, the process 300 is performed by a local computing system, and outputs a trained image processing model to be stored and used by the same local computing system. The process 300 is a generalized image processing model training process and is not specific to training image processing models for detecting clothes types as described in FIG. 2.

The process 300 is a multi-pass process including at least a first training pass 301 and a second training pass 303. Compared to a traditional single-pass image processing model training process (e.g., backpropagation in CNN), the process 300 improves inference accuracy by first identifying "difficult" data points in the training data set (e.g., a group of data points that cause the image processing model to output false positive inference results), and then adding additional output classes to the image processing model to account for inference results by these difficult data points. As a result, the process 300 effectively turns a bi-classification model (e.g., a first image processing 306) into a multi-classification model (e.g., a second image processing model 306).

During the first training pass 301, the computing system uses a first set of training data 302 in a first training session 304 to generate a first image processing model 306. The first set of training data 302 comprises annotated data suitable for image processing model training. For example, the first set of training data 302 may be a set of images labeled with clothes types (e.g., when the home appliance is a washing machine) or labeled with food item types (e.g., when the home appliance is a smart oven or microwave oven). In some embodiments, a single image contains multiple data with different data types. For example, an image may contain multiple clothes of different types. In such case, the image is divided into a plurality of sub-images, each with a single data type (e.g., clothes type), before being used in the first training session 304.

The first training session 304 outputs an image processing model that fits data (e.g., images of clothes loaded inside a washing machine) to one or more predefined output classes (e.g., clothes types). Examples of image processing models include linear regression, logistic regression, support vector machines, neural networks, and so on. During the first training session 304, image processing model parameters (e.g., weights connecting nodes in a neural network) are being fine-tuned to minimize a predefined loss function (e.g., using the gradient descent method), wherein the loss function measures how well the image processing model's predicted data types compare to the actual data types.

At the conclusion of the first training session 304, the first image processing model 306 is generated. The computing system then tests the first image processing model 306 in a first validation session 308. During the first validation session 308, the first image processing model 306 receives a set of validation data and predicts the corresponding data types. In some embodiments, the computing system feeds the first set of training data 302 to the first image processing model 306 as the validation data. Alternatively, the computing system uses a different set of annotated data from the first set of training data 302 as the validation data.

In some embodiments, the first image processing model 306 is a bi-classification predictor (e.g., a neural network with an output node to determine whether an input image contains a specific type of clothes). The output (also known as prediction) from the bi-classification image processing model 306, when compared to the actual input data type, can be categorized as one of four classes: (1) true positive results 314, (2) true negative results 316, (3) false positive results 310, and (4) false negative results 312.

True positive results 314 indicate that the first image processing model 306 has correctly classified an input sample as belonging to a data type (e.g., predicting that an image contains shirts, and the image indeed contains shirts).

True negative results 312 indicate that the first image processing model 306 has correctly predicted an input sample as not belonging to a data type (e.g., predicting that an image does not contain shirts, and the image contains only socks).

False positive results 310 indicate that the first image processing model 306 has incorrectly predicted that an input sample as belonging to a data type (e.g., predicting that an image contains shirts, but the image contains only socks).

False negative results 312 indicate that the first image processing model 306 has incorrectly predicted that the input data as not belonging to a data type (e.g., predicting that an image does not contain shirts, but the image actually does contain shirts).

In some embodiments, certain groups of samples are prone to misclassification, and consistently cause the first image processing model 306 to produce false positive results. For example, in the context of detecting clothes types based on image taken from the inside of a washing machine, twisted clothes such as shirts are often falsely detected as brassieres. Therefore, an image processing model configured to detect brassieres is likely to have false-positive predictions when presented with images with only twisted shirts.

To reduce the number of false positive results by the first image processing model 306 (e.g., to increase the precision of model) while not increasing the number of false negative results (e.g., to maintain or reduce the recall of the model), the computing system performs a second training pass 303 to generate a second image processing model 328 based on the first image processing model 306. During the second training pass 302, the computing system identifies a group of data from the first set of training data 302 that have caused the first image processing model 306 to produce false positive results in the first validation session 308, and applies an additional label to the identified group of data. For example, an image containing a twisted shirt originally has the data type of "shirt." Since this image has caused the first image processing model 306 to produce a false-positive result, the computing system will replace the shirt data type with a second data type indicating that it belongs to a "pseudo-false positive class 318" (e.g., "pseudo-shirt").

In some embodiments, if the set of training data include image data, to increase the number of the newly created pseudo-false positive data pointing for training purpose, the computing system performs image augmentation 322 on the identified pseudo-false positive images. If the data are not image data, other types of data augmentation may be performed or data augmentation may be skipped.

After applying the pseudo-false positive label 318 to the data that have caused the first image processing model 306 to produce false positive results, and performing image augmentation 322 (if the data include image data), the computing system forms a second set of training data 324 by including the first set of training data 302, the newly generated data with the pseudo-false positive data types.

Next, the computing system uses the second set of training data 324 to re-train the first image processing model 306 in a second training session 326 to generate a second image processing model 328. Compared to the first image processing model 306, the second image processing model 328 has an additional output that corresponds to the pseudo-false positive data type. As a result, data having pseudo-false positive label are classified into a separate class during both training and inference with the second image processing model 328. For example, the first and the second image processing models may be configured to detect brassieres in washing machine. As described above, certain types of clothes, when twisted or tangled, may resemble brassieres in parts and cause the image processing model to output false positive results. With the process 300, the second image processing model 328 is now configured to receive an image and classify objects on the image as (1) brassieres, (2) clothes that are very similar to brassieres (e.g., those that have caused the first image processing model 306 to give false positive results), and (3) other types of clothes (e.g., socks, jeans, and other clothes that have been correctly predicted not to be brassieres by the first image processing model). Therefore, the process 300 adds granularity to the output of an image processing model, thus increasing the image processing model's precision while maintaining its recall.

In some embodiments, instead of using the group of data that has caused the first image processing model 306 to output false positive results 310 during the first validation session 308, the computing system can use, additionally or optionally, a group of data that has causes the first image processing model 306 to output false negative results 312.

The resulting second image processing module 328 for a given object type is used to process input images and generate inference results that detect the respective type of objects. In some embodiments, for each object type (e.g., delicates, towel, bedding, red clothing items, etc.) that is relevant to selection of a machine setting for a particular operation of the machine (e.g., wash cycle of a wash session), the multi-pass model training described in FIG. 3 can be utilized to generate an improved image processing model for identifying items of the object type, and for each operation, more than one of the improved image processing models (e.g., improved image processing models for detecting both delicate clothing items and red items) are activated, and the results from these multiple improved image processing models are combined (e.g., in accordance with preset prioritization of their influence on the settings, etc.) to generate a setting value for the particular operation.

FIG. 4 is a schematic of image processing models that are generated during the multi-pass training process described in FIG. 3, with the updated model having increased precision of object detection and bi-class classification while maintaining the recall, in accordance with some embodiments. Although a neural network is shown in FIG. 4, in some alternative embodiments, other types of image processing models can be reconfigured in the same way to improve prediction accuracy. The original model 402 comprises an input layer 404, one or more hidden layers 406, and an output layer 408. The output layer 408 comprises two nodes (e.g., bi-classification), corresponding to predicted "positive results" and "negative results." For example, the original model 402 can be the first image processing model 306 as described in FIG. 3.

After a retraining process, such as that described in FIG. 3, the original model 402 is updated to become an updated model 403. The updated model 40 includes an input layer 404', one or more hidden layers 406', and an output layer 408'. Compared to the original model 402, the updated model 403 has one additional output node, a pseudo-class output 410. As described above, the pseudo-class output 410 indicates that a data point is a "difficult sample" that is prone to misclassification, such as having caused the original model 402 to give false positive or false negative results.

FIG. 5 is a flowchart diagram of a method 500 for performing an automated machine setting selection based on image detection and bi-class classification results produced through multi-pass training of object detection models, in accordance with some embodiments. For convenience, the method 500 will be described as being performed by a computing system including multiple servers connected via a network, wherein each server of the computing system is dedicated to performing a specific task. For example, the computing system can include a training model server (e.g., the training model server 122 of FIG. 1A) and an appliance server (e.g., the computing system 130' of FIG. 1C). In some embodiments, the machine is a washing machine, oven, microwave oven, refrigerator, or other home appliances.

As the first step, the computing system (e.g., via the training model server) receives a first image processing model that is trained to classify a respective input image into a first class for images containing at least one object of a first type or a second class for images not containing at least one object of the first type (502). Therefore, the first image processing model is a bi-class classifier that classifies an image as either belonging to the first class or the second class. For example, the first image processing model is designed to classify images of clothes (e.g., laundry images taken from a washing machine) as either containing a type of clothes (e.g., shirts) or not containing the type of clothes (e.g., no shirts). In some embodiments, the first image processing model is a neural network that has previously been trained in a remote server using a first set of training data, where the first set of training data includes images with labeled objects.

After receiving the first image processing model, the computing system identifies from a plurality of inference results output by the first image processing model, a first subset of inference results that are false positive results classifying a first set of images not containing at least one object of the first type into the first class for images containing at least one object of the first type (504). In some embodiments, an image processing module of the computing system (e.g., image processing module 154' of FIG. 1C) is configured to perform the inference task. In some embodiments, to produce the plurality of inference results, the computing system (via the image processing module) validates the first image processing model against the first set of training data (e.g., the set of training data that has been used to generate the first image processing model), or a first set of inference data different from the first set of training data, or a combination of both. Both the first set of training data and the first set of inference data include images labeled with object types (e.g., images labeled as containing "shirts," "socks," "dresses," etc.). For example, the images in the first set of images are labeled as containing clothes types, and the first image processing model is designed to detect whether an image contains "shirts." The first subset of inference results therefore include images that do not include any shirt but are nevertheless falsely classified by the first image processing model as containing shirts.

The computing system then generates a first set of new training data from the first set of images, including augmenting a respective image in the first set of images to obtain a first respective plurality of images and labeling the first respective plurality of images as containing at least one object of a pseudo first class that is distinct from the first class and the second class (506). In some embodiments, the computing system generates the first set of new training data via a training set server (e.g., the training set server 120 of FIG. 1A). In some embodiments, the computing system augments respective images in the first set of images by creating variations of the respective images through image distortion, flipping, adjusting image brightness, magnifying an image, and so on. Augmenting images increase the size of a training dataset and can better train an image processing model to perform object detection and classification. For example, the images in the first set of images are labeled as containing clothes types, the first image processing model is designed to detect whether an image contains "shirts," and a subset of the first set of images, which do not contain shirts, have been falsely classified as containing shirts during the previous inference step. As a result, the images in the subset of the first set of images will receive a special class label that is different from any previous clothes labels, such as "pseudo-shirt." This class label indicates that these images contain objects that are prone to misclassification (causing the first image processing model to produce false positive results). In some embodiments, the computing system via the training set server removes the old label of the subset of first set of images. As a result, these images are no longer labeled with clothes types, but only the new "pseudo-class" label.

After obtaining the first set of new training data, the computing system via a training model server (e.g., the training model server 122 of FIG. 1A) then trains, using a training dataset including at least the first set of new training data, a second image processing model to classify a respective input image into the first class for images containing at least one object of the first type, the second class for images not containing at least one object of the first type, and the first pseudo class for images that contain objects that are prone to misclassification into the first class by the first image processing model (508). Therefore, the second image processing model, compared to the first image processing model which is designed to perform bi-classification, has an additional output that corresponds to classifying an image as containing an object of the pseudo class (e.g., objects that have caused the first image processing model to output false positive results). For example, the training dataset can include images labeled as containing "shirts," images not labeled as containing shirts (e.g., containing only "socks," "dresses," etc.), and images labeled as containing "pseudo-shirts." It is noted that the first class and the second class in the second training model are different from the first class and the second class in the first training model because the second training model is trained to not include the images (e.g., images that are prone to be included in the first class but actually belong to the second class in accordance with the first training model) that belong to the first pseudo class into the first class and the second class.

Finally, the computing system via an appliance server (e.g., the appliance-function control unit 153''' of FIG. 1C) modifies a device setting of a first machine based on a first inference result of a first input image captured by the first machine, wherein the first inference result is generated by the second image processing model and corresponds to the first class (510). For example, if the computing system determines that images of laundry loaded in a washing machine contains a specific type of clothes (e.g. shirts), the computing system can select a washer cycle based on the detected clothes types to minimize damage to clothes and maximize cleaning results.

In some embodiments, the computing system captures the first input image at the first machine before a first operation is performed by the first machine on objects captured in the first input image, wherein the device setting is a setting of the first operation performed by the first machine. For example, the first machine is a washing machine and the first operation is a washing operation, and the device setting is a particular washer cycle setting. The washing machine, before operating, takes an image of laundry loaded in the washing machine, determines the clothes types, and operates the washing machine accordingly by selecting an appropriate washer cycle setting.

In some embodiments, there are multiple image processing models and the computing system uses a different image processing model to detect a different type of object and to apply a different setting. The computing system trains a fourth image processing model for classifying a respective input image into a third class for image containing at least one object of a second type that is distinct from the first type, a fourth class for images not containing at least one object of the second type, or a pseudo third class for images containing objects that are prone to misclassification into the third class by a third image processing model that is trained to classify the respective input image only into the third class and the fourth class, and modifies a different device setting of the first machine based on a second inference result of the first input image captured by the first machine wherein the second inference result is generated by the fourth image processing model and corresponds to the third class. For example, a washing machine may use one image processing model to classify shirts, and another image processing model to detect jeans. Both the image processing model for shirts and for jeans can be improved using the multi-pass training process described above. The computing system then select a washer cycle setting both on the presence of absence of shirts and jeans. For example, if both shirts and jeans are present in laundry, the washing time may be longer than that for only shirts or only jeans.

In some embodiments, augmented false negative samples are, optionally or alternatively, labeled and merged with true positive samples in the new training data. As a result, the new image processing model is trained to classify samples that are prone to be misclassified as false negatives. The computing system first identifies, from the plurality of inference results output by the first image processing model, a second subset of inference results that are false negative results classifying a second set of images containing at least one object of the first type into the second class for not containing at least one object of the first type. For example, the second subset of inference results may include images that contain shirts, but are classified as not containing shirts by the first image processing model.

Based on the second subset of inference results, the computing system generates a second set of new training data from the second set of images, including augmenting a respective image in the second set of images to obtain a second respective plurality of images and labeling the second respective plurality of images as images of the first class. For example, the computing system can perform these tasks similar to creating the "pseudo-class" as described above.

The computing system then adds the second respective plurality of images to the training dataset as training images corresponding to the first class along with images correctly classified into the first class by the first image processing model. For example, in the case of an image processing model designed to detect shirts, the training dataset would include four types of data: (1) images containing shirts, (2) images containing objects that are prone to be misclassified as shirts ("pseudo-shirts"), (3) images containing objects that are not shirts and not "pseudo-shirts"), and (4) images containing objects that are shirt but are prone to be misclassified as not shirts.

In some embodiments, a user identifies false positive results as they occur during training. As a result, networked machines with legacy models can contribute to the training dataset before they are upgraded. The computing system collects user input identifying an additional inference result generated by a copy of the first image processing model used by a second machine as a false positive result; and adding a respective image captured at the second machine that corresponds to the additional inference result to the training dataset for training the second image processing model.

Figure 6:
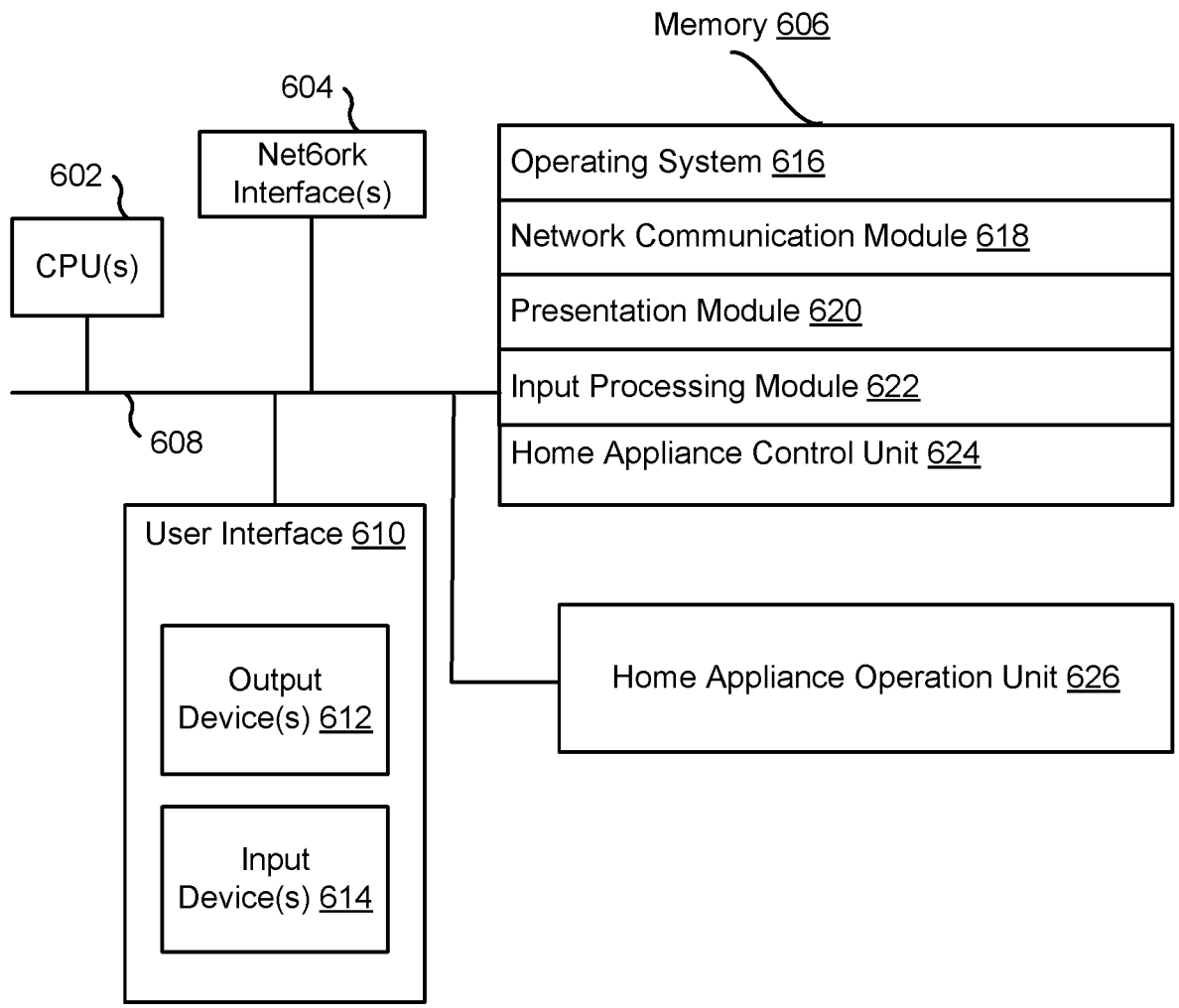
FIG. 6 is a diagram of an exemplary home appliance, in accordance with some embodiments.

FIG. 6 is a block diagram of an exemplary home appliance 600 in accordance with some embodiments. The home appliance 600 can serve as appliance 18, 112, 114, 140, 140', 200, 201, 202, 203, 204, for example, in various embodiments. The home appliance 600 includes one or more processing units (CPUs) 602, one or more network interfaces 604, memory 606, and one or more communication buses 608 for interconnecting these components (sometimes called a chipset). Home appliance 600 also includes a user interface 610. User interface 610 includes one or more output devices 612 that enable presentation of media content, including one or more speakers and/or one or more visual displays. User interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. In some embodiments, home appliance 600 further includes sensors (e.g., sensors 141, 142), which senses operating environment information of the home appliance 600. Sensors include but are not limited to one or more heat sensors, light sensors, one or more cameras, humidity sensors, one or more motion sensors, one or more biological sensors (e.g., a galvanic skin resistance sensor, a pulse oximeter, and the like), weight sensors, spectrometers, and other sensors. Furthermore, the home appliance 600 includes home appliance operation unit 626 (e.g., heating means that are based on electricity, induction, gas, radiation, etc.). Memory 606 includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

operating system 616 including procedures for handling various basic system services and for performing hardware dependent tasks;

network communication module 618 for connecting to external services via one or more network interfaces 604 (wired or wireless);

presentation module 620 for enabling presentation of information;

input processing module 622 for detecting one or more user inputs or interactions from one of the one or more input devices 614 and interpreting the detected input or interaction;

home appliance control unit 624, which controls the home appliance 600, including but not limited to modules of appliance 140 or 140' as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

What is claimed is:

1. A method, comprising:
at a computing device having one or more processors and memory:
receiving a first image processing model that is trained to classify a respective input image into a first class for images containing at least one object of a first type or a second class for images not containing at least one object of the first type;
identifying, from a plurality of inference results output by the first image processing model, a first subset of inference results that are false positive results classifying a first set of images not containing at least one object of the first type into the first class for images containing at least one object of the first type;
generating a first set of new training data from the first set of images, including augmenting a respective image in the first set of images to obtain a first respective plurality of images and labeling the first respective plurality of images as containing at least one object of a pseudo first class that is distinct from the first class and the second class;
training, using a training dataset including at least the first set of new training data, a second image processing model to classify a respective input image into the first class for images containing at least one object of the first type, the second class for images not containing at least one object of the first type, and the first pseudo class for images that contain objects that are prone to misclassification into the first class by the first image processing model; and
modifying a device setting of a first machine based on a first inference result of a first input image captured by the first machine, wherein the first inference result is generated by the second image processing model and corresponds to the first class.

2. The method of claim 1, including:
capturing the first input image at the first machine before a first operation is performed by the first machine on objects captured in the first input image, wherein the device setting is a setting of the first operation performed by the first machine.

3. The method of claim 1, including:
training a fourth image processing model for classifying a respective input image into a third class for images containing at least one object of a second type that is distinct from the first type, a fourth class for images not containing at least one object of the second type, or a pseudo third class for images containing objects that are prone to misclassification into the third class by a third image processing model that is trained to classify the respective input image only into the third class and the fourth class; and
modifying a different device setting of the first machine based on a second inference result of the first input image captured by the first machine, wherein the second inference result is generated by the fourth image processing model and corresponds to the third class.

4. The method of claim 1, including:
identifying, from the plurality of inference results output by the first image processing model, a second subset of inference results that are false negative results classifying a second set of images containing at least one object of the first type into the second class for not containing at least one object of the first type;
generating a second set of new training data from the second set of images, including augmenting a respective image in the second set of images to obtain a second respective plurality of images and labeling the second respective plurality of images as images of the first class; and
adding the second respective plurality of images to the training dataset as training images corresponding to the first class along with images correctly classified into the first class by the first image processing model.

5. The method of claim 1, including:
collecting user input identifying an additional inference result generated by a copy of the first image processing model used by a second machine as a false positive result; and
adding a respective image captured at the second machine that corresponds to the additional inference result to the training dataset for training the second image processing model.

6. The method of claim 1, wherein the first image processing model and the second image processing model are trained on a first server, wherein the first set of new training data is generated on second server, and wherein the first inference result is generated by the second image processing model on a third server, and wherein the first, second, and the third servers are connected by a network.

7. The method of claim 4, including:
identifying, from the plurality of inference results output by the first image processing model, a third subset of inference results that are true negative results classifying a third set of images not containing at least one object of the first type into the second class; and
adding images corresponding to the third subset of inference results into the training dataset as training images corresponding to the second class.

8. A computing device, comprising:
one or more processors; and
memory storing instructions, the instructions, when executed by the one or more processors, cause the processors to perform operations comprising:
receiving a first image processing model that is trained to classify a respective input image into a first class for images containing at least one object of a first type or a second class for images not containing at least one object of the first type;
identifying, from a plurality of inference results output by the first image processing model, a first subset of inference results that are false positive results classifying a first set of images not containing at least one object of the first type into the first class for images containing at least one object of the first type;
generating a first set of new training data from the first set of images, including augmenting a respective image in the first set of images to obtain a first respective plurality of images and labeling the first respective plurality of images as containing at least one object of a pseudo first class that is distinct from the first class and the second class;
training, using a training dataset including at least the first set of new training data, a second image processing model to classify a respective input image into the first class for images containing at least one object of the first type, the second class for images not containing at least one object of the first type, and the first pseudo class for images that contain objects that are prone to misclassification into the first class by the first image processing model; and
modifying a device setting of a first machine based on a first inference result of a first input image captured by the first machine, wherein the first inference result is generated by the second image processing model and corresponds to the first class.

9. The computing device of claim 8, wherein the operations include:
capturing the first input image at the first machine before a first operation is performed by the first machine on objects captured in the first input image, wherein the device setting is a setting of the first operation performed by the first machine.

10. The computing device of claim 8, wherein the operations include:
training a fourth image processing model for classifying a respective input image into a third class for images containing at least one object of a second type that is distinct from the first type, a fourth class for images not containing at least one object of the second type, or a pseudo third class for images containing objects that are prone to misclassification into the third class by a third image processing model that is trained to classify the respective input image only into the third class and the fourth class; and
modifying a different device setting of the first machine based on a second inference result of the first input image captured by the first machine, wherein the second inference result is generated by the fourth image processing model and corresponds to the third class.

11. The computing device of claim 8, wherein the operations include:
identifying, from the plurality of inference results output by the first image processing model, a second subset of inference results that are false negative results classifying a second set of images containing at least one object of the first type into the second class for not containing at least one object of the first type;
generating a second set of new training data from the second set of images, including augmenting a respective image in the second set of images to obtain a second respective plurality of images and labeling the second respective plurality of images as images of the first class; and
adding the second respective plurality of images to the training dataset as training images corresponding to the first class along with images correctly classified into the first class by the first image processing model.

12. The computing device of claim 8, wherein the operations include:
collecting user input identifying an additional inference result generated by a copy of the first image processing model used by a second machine as a false positive result; and
adding a respective image captured at the second machine that corresponds to the additional inference result to the training dataset for training the second image processing model.

13. The computing device of claim 8, wherein the first image processing model and the second image processing model are trained on a first server, wherein the first set of new training data is generated on second server, and wherein the first inference result is generated by the second image processing model on a third server, and wherein the first, second, and the third servers are connected by a network.

14. The computing device of claim 11, wherein the operations include:
identifying, from the plurality of inference results output by the first image processing model, a third subset of inference results that are true negative results classifying a third set of images not containing at least one object of the first type into the second class; and
adding images corresponding to the third subset of inference results into the training dataset as training images corresponding to the second class.

15. A non-transitory computer-readable storage medium storing instructions, the instructions, when executed by one or more processors, cause the processors to perform operations comprising:
receiving a first image processing model that is trained to classify a respective input image into a first class for images containing at least one object of a first type or a second class for images not containing at least one object of the first type;
identifying, from a plurality of inference results output by the first image processing model, a first subset of inference results that are false positive results classifying a first set of images not containing at least one object of the first type into the first class for images containing at least one object of the first type;
generating a first set of new training data from the first set of images, including augmenting a respective image in the first set of images to obtain a first respective plurality of images and labeling the first respective plurality of images as containing at least one object of a pseudo first class that is distinct from the first class and the second class;
training, using a training dataset including at least the first set of new training data, a second image processing model to classify a respective input image into the first class for images containing at least one object of the first type, the second class for images not containing at least one object of the first type, and the first pseudo class for images that contain objects that are prone to misclassification into the first class by the first image processing model; and
modifying a device setting of a first machine based on a first inference result of a first input image captured by the first machine, wherein the first inference result is generated by the second image processing model and corresponds to the first class.

16. The non-transitory computer-readable storage medium of claim 15, wherein the operations include:
capturing the first input image at the first machine before a first operation is performed by the first machine on objects captured in the first input image, wherein the device setting is a setting of the first operation performed by the first machine.

17. The non-transitory computer-readable storage medium of claim 15, wherein the operations include:
training a fourth image processing model for classifying a respective input image into a third class for images containing at least one object of a second type that is distinct from the first type, a fourth class for images not containing at least one object of the second type, or a pseudo third class for images containing objects that are prone to misclassification into the third class by a third image processing model that is trained to classify the respective input image only into the third class and the fourth class; and
modifying a different device setting of the first machine based on a second inference result of the first input image captured by the first machine, wherein the second inference result is generated by the fourth image processing model and corresponds to the third class.

18. The non-transitory computer-readable storage medium of claim 15, wherein the operations include:
   identifying, from the plurality of inference results output by the first image processing model, a second subset of inference results that are false negative results classifying a second set of images containing at least one object of the first type into the second class for not containing at least one object of the first type;
   generating a second set of new training data from the second set of images, including augmenting a respective image in the second set of images to obtain a second respective plurality of images and labeling the second respective plurality of images as images of the first class; and
   adding the second respective plurality of images to the training dataset as training images corresponding to the first class along with images correctly classified into the first class by the first image processing model.

19. The non-transitory computer-readable storage medium of claim 15, wherein the operations include:
   collecting user input identifying an additional inference result generated by a copy of the first image processing model used by a second machine as a false positive result; and
   adding a respective image captured at the second machine that corresponds to the additional inference result to the training dataset for training the second image processing model.

20. The non-transitory computer-readable storage medium of claim 15, wherein the first image processing model and the second image processing model are trained on a first server, wherein the first set of new training data is generated on second server, and wherein the first inference result is generated by the second image processing model on a third server, and wherein the first, second, and the third servers are connected by a network.

* * * * *